United States Patent [19]

Farkas et al.

[11] 4,364,764
[45] Dec. 21, 1982

[54] AUTOMATIC STOP ROUTINE FOR A GLASSWARE FORMING MACHINE

[75] Inventors: Daniel S. Farkas; Eric R. Zabor, both of Toledo, Ohio

[73] Assignee: Owens-Illinois, Inc., Toledo, Ohio

[21] Appl. No.: 324,754

[22] Filed: Nov. 25, 1981

Related U.S. Application Data

[63] Continuation of Ser. No. 182,196, Aug. 28, 1980, abandoned, which is a continuation-in-part of Ser. No. 970,691, Dec. 18, 1978, abandoned, which is a continuation of Ser. No. 866,085, Dec. 30, 1977, abandoned.

[51] Int. Cl.$^3$ ............................................. C03B 9/40
[52] U.S. Cl. ......................................... 65/29; 65/158; 65/159; 65/163; 65/164; 364/473; 364/476; 65/DIG. 13
[58] Field of Search ................... 65/29, 160, 163, 164, 65/158, 159, DIG. 13; 364/473, 476

[56] References Cited

U.S. PATENT DOCUMENTS

| | | | |
|---|---|---|---|
| 3,762,907 | 10/1973 | Quinn et al. | 65/164 |
| 3,867,122 | 2/1975 | Miller | 65/159 |
| 3,905,793 | 9/1975 | Croughwell | 65/163 |
| 4,108,623 | 8/1978 | Cardenas-Franco | 65/163 |

Primary Examiner—Arthur D. Kellogg
Attorney, Agent, or Firm—Gerald T. Welch; Myron E. Click; David H. Wilson

[57] ABSTRACT

A method and apparatus for automatically stopping an automatic glassware forming machine in an orderly sequence of steps. When it is desired to start the machine, a start routine is initiated to move the various glassware forming mechanisms into the appropriate starting positions such that the glassware forming cycle can begin. A stop routine is provided to cycle the glass from the machine and to move the various glassware forming mechanisms into a stationary position where they can be easily accessed. In accordance with the present invention, if the stop routine is intiated before at least one predetermined exit point in the start routine, the stop routine will be entered at an intermediate step such that only those steps concerned with moving the forming mechanisms into the final stationary position will be performed.

14 Claims, 10 Drawing Figures

FIG. 1

A. DELIVERY    B. SETTLE BLOW    C. COUNTER BLOW

D. TRANSFER FROM BLANK MOLD TO BLOW MOLD

E. REHEAT    F. FINAL BLOW    G. TAKEOUT

FIG. 2

RUN ROUTINE

```
DISTRIBUTE GOB ─────────── -0°-
BLANK MOLD CLOSE ────────
FUNNEL DOWN ───────────── -30°-
PLUNGER UP ──────────
GOB ARRIVES ─────────
THIMBLE UP ──────────
SCOOP OFF ───────────
BAFFLE ON ───────────                    ──── FINAL BLOW ON
SETTLE BLOW ON ──────  -60°-
SETTLE BLOW OFF ─────
BAFFLE OFF ──────────
FUNNEL UP ───────────
PLUNGER DOWN ────────
                       -90°-

BAFFLE ON ───────────────
COUNTER BLOW ON ─────────  -120°-

-150°-
                                         ──── FINAL BLOW OFF
COUNTER BLOW OFF ────────                ──── BLOW MOLD OPEN
THIMBLE DOWN ────────────                ──── BLOW HEAD UP
BAFFLE OFF ──────────────  -180°-
BLANK MOLD OPEN ─────────

-210°-           ──── TAKEOUT IN

INVERT ──────────────────                ──── TAKEOUT OUT
                        -240°-
BLOW MOLD CLOSE ─────────

-270°-
NECK RING OPEN ──────────

REVERT ──────────────────  -300°-

NECK RING CLOSE ──────── -330°-
BLOW HEAD ON ───────────
SCOOP ON ───────────────

AUTOMATIC STOP ROUTINE FOR A GLASSWARE FORMING MACHINE

CROSS-REFERENCE TO RELATED APPLICATIONS

The present application is a continuation of U.S. Patent Application Ser. No. 182,196, filed Aug. 28, 1980, which is a continuation-in-part of U.S. Patent Application Ser. No. 970,691, filed Dec. 18, 1978, which is a continuation of U.S. Patent Application Ser. No. 866,085, filed Dec. 30, 1977, all of the prior applications now abandoned.

BACKGROUND OF THE INVENTION

1. Field of the Invention

The present invention relates generally to machines for forming glassware articles from gobs of molten glass and in particular to electronically controlled individual section glassware forming machines.

2. Description of the Prior Art

The individual section or IS glassware forming machine is well known and includes a plurality of sections each having means for forming glassware articles in a timed, predetermined sequence of steps. Typically, each section includes a blank mold station for receiving gobs of molten glass at a predetermined rate and for partially forming articles of glassware. A partially formed article of glassware of the type produced by the blank mold is typically referred to as a parison. The parison is then transferred to a blow mold station wherein the formation of the glassware article is completed. The sections are operated in synchronism at a relative phase difference such that one section is receiving a gob while another section is delivering a finished glassware article to a conveyor and one or more other sections are performing various ones of the intermediate forming steps.

The forming means in each section are typically operated from pneumatic motors or actuators. In early prior art machines, the pneumatic motors were controlled by a valve block which in turn was controlled by a timing drum for each section driven from a line shaft which synchronized all parts of the machine. Manually adjustable cams were positioned on the timing drum for actuating the valves in the valve block. Timing was adjusted by loosening, moving and tightening the cams as the drum rotated.

One of the limitations of the timing drum was the difficulty of adjusting the timing during the operation of the machine. One solution to this problem was to replace all the timing drums with an electronic control means. The electronic control means included a master unit which was responsive to a clock pulse generator and to a reset pulse generator both driven by the line shaft. The master unit generated reset signals to a separate control circuit for each of the individual sections to synchronize the operation of the individual circuits. Each control circuit included a pulse counter responsive to the clock pulses and the master unit generated reset pulses for counting the degrees of the section cycle. Each individual circuit included forty-eight three-decade thumbwheel switches for setting the degree of rotation of the machine thereon. Thus, each particular function of the glassware forming cycle was controlled by one of the thumbwheel switches. Such a control system is disclosed in U.S. Pat. No. 3,762,907.

The previously described electronic control system utilized discrete components in its counter and gating circuitry. In a later prior art control apparatus, a digital computer with a memory and associated program storage was utilized. Not only did such a control circuit provide a means for automatically changing the timing values of the functions without the manual resetting of thumbwheel switches, but such a circuit also provided a means for programming events, groups of related functions, in accordance with certain boundary event timings. The computer generated the control signals through an interface circuit to actuate solenoid controlled valve blocks. Such a control system is disclosed in U.S. Pat. No. 3,905,793.

Typically, the prior art control system had means for automatically performing a sequence of steps for moving the glassware forming mechanisms into positions for operation in a normal operating cycle. This was known as a programmed start. The prior art control systems also included means for initiating an emergency stop or a programmed stop. The emergency stop was effective at any time to immediately stop the machine and to release anything caught in the molds, the neck ring, or the blow head. The programmed stop was only effective during a normal operating cycle to automatically perform a sequence of steps for moving the glassware forming mechanisms into positions for ease of maintenance. The prior art control systems function to initiate an emergency stop if the programmed stop button is actuated during a programmed start.

SUMMARY OF THE INVENTION

The present invention is concerned with a control system for automatically stopping an automatic glassware forming machine in an orderly sequence of steps. The machine includes a gob distributor which distributes gobs severed from a stream of molten glass at a predetermined rate to a blank mold station in each individual section of the machine. The blank mold forms a parison from each molten gob of glass during a first predetermined sequence of steps. A transfer mechanism is provided to invert and transfer the parison to a blow mold station in each individual section wherein the formation of the glassware is completed in a second predetermined sequence of steps.

The control system for the glassware forming machine includes a machine supervisory computer which is connected to a plurality of individual section computers each of which is associated with a particular individual section. A separate section operator console is also provided for each section such that the status of each section can be controlled. When an individual section is on, it is designated to be in the "run" condition and, when the section is off, it is designated to be in the "safe" condition. A start routine is executed by each section computer to automatically switch an individual section from the safe condition to the run condition and a stop routine is executed to automatically switch a section from the run to the safe condition.

The start routine executes a predetermined sequence of steps whereby the various glassware forming mechanisms are moved into the appropriate starting positions. The stop routine executes another predetermined sequence of steps whereby the glass present in the molds is cycled from the section and the various glassware forming mechanisms are moved into a position in which they may be easily accessed for either replacement or repair. In accordance with the present invention, if the stop routine is initiated before at least one predetermined exit point in the start routine, only those steps of the stop routine concerned with the final positioning of the forming mechanisms will be executed. It is not necessary to execute the steps concerned with cycling the glass from the section since there will be no glass present in the molds during the start routine. It will be appreciated that a programmed stop, whether initiated during the start routine or when the machine is in the "run" condition, does not effect an immediate or emergency stop of the machine. Such an emergency stop functions only to release anything which may be caught in the molds, the neck ring, or the blow head. Rather, a programmed stop in accordance with the present invention is initiated only at a predetermined exit point in the start sequence or "run" cycle, whether or not there is glass in the machine, so as to place the forming mechanisms in positions for ease of maintenance.

Accordingly, it is an object of the present invention to automatically stop an automatic glassware forming machine in an orderly sequence of steps from at least one predetermined exit point during the start-up cycle of the machine.

DESCRIPTION OF THE PREFERRED EMBODIMENT

Figure 1:
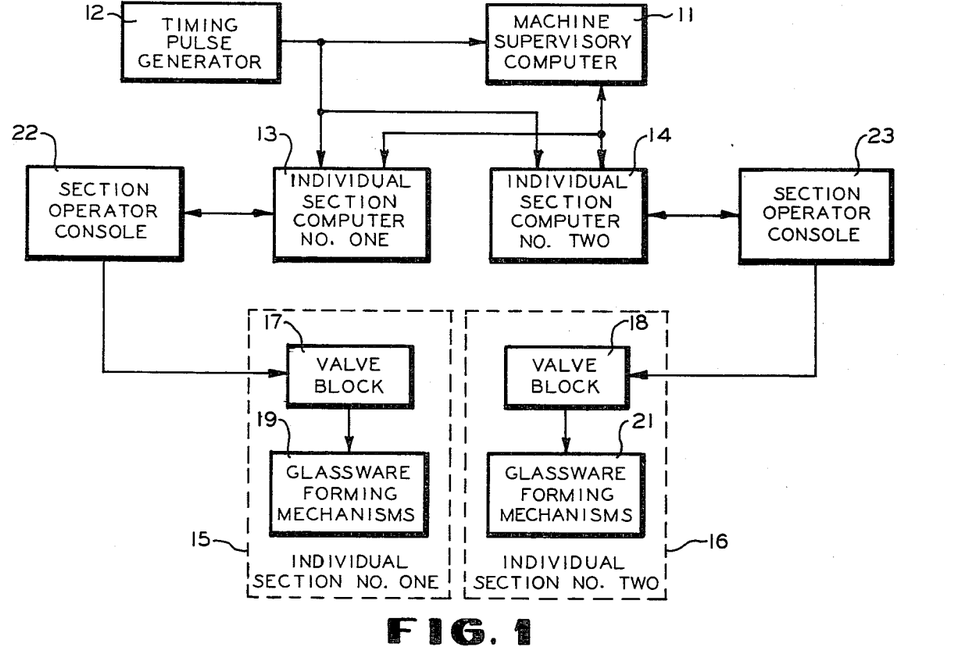
FIG. 1 is a block diagram of a two section IS machine to which the present invention is applicable.

There is shown in FIG. 1 a block diagram of an individual section glassware forming machine to which the present invention is applicable. Although a brief description appears herein, a more detailed description of this type of glassware forming machine can be found in U.S. Pat. No. 4,152,134, issued May 1, 1979, in the names of W. Thomas Dowling and Daniel S. Farkas, and assigned to the assignee of the present invention.

A machine supervisory computer 11 receives a train of timing pulses from a timing pulse generator 12 to establish the timing for the machine cycle. The machine supervisory computer 11 is connected to a pair of individual section computers 13 and 14 which are respectively connected to an individual section No. One 15 and an individual section No. Two 16. The individual sections 15 and 16 include valve blocks 17 and 18 respectively and a plurality of glassware forming mechanisms 19 and 21 respectively.

The individual sections 15 and 16 each receive gobs of molten glass from a gob distributor (not shown). The gob distributor supplies the gobs to the individual sections at a predetermined rate proportional to the speed of the gob distributor drive motor (not shown). The speed of this drive motor is determined by the frequency of the alternating current power generated by a power source such as an inverter drive (not shown). If the timing pulse generator 12 is responsive to the frequency of the power source, the cycle time of each individual section and, therefore, the cycle time of the machine will be proportional to the gob distribution rate.

Initially, the machine supervisory computer 11 loads the individual section computers 13 and 14 with control programs and timing data for controlling the associated individual sections. Thereafter, the individual section computers 13 and 14 control the glassware forming cycles of the associated individual sections by generating control signals to the respective valve blocks in response to the execution of the control programs and the timing pulses from the timing pulse generator 12.

The timing pulse generator 12 generates a clock signal to the machine supervisory computer 11 and the individual section computers 13 and 14 which signal provides a reference for timing the machine cycle and the sequence of steps to be performed by the individual section computers. Typically, machine timing is expressed in degrees and a machine cycle is 360° in length. Thus, 360 clock pulses or some multiple thereof comprise one machine cycle. The cycle for each individual section is also 360° but the cycles for the sections will be offset from the start of the machine cycle by a different number of degrees to compensate for the difference in gob delivery time to each section. The timing pulse generator 12 also generates a reset pulse, after generating the clock pulses representing one cycle, which reset pulse is utilized by the machine supervisory computer 11 and the individual section computers 13 and 14 to define the end and beginning of successive machine cycles. This type of timing pulse generator is the subject matter of U.S. Pat. No. 4,145,204, issued Mar. 20, 1979 in the names of Daniel S. Farkas and Philip D. Perry and U.S. Pat. No. 4,145,205, issued Mar. 20, 1979 in the names of Daniel S. Farkas and Erwin M. Ferenczy, both assigned to the assignee of the present invention. The timing pulse generator can also be of the shaft encoder type. In either case, the rate of distribution of the gobs is synchronized with the clock signal generated by the timing pulse generator.

The valve blocks 17 and 18 are connected to control the glassware forming mechanisms 19 and 21 respectively in a predetermined timed sequence of steps to form the articles of glassware. The valves in the valve blocks 17 and 18 are actuated by solenoids (not shown) which are controlled by the respective individual section computers in accordance with the control programs and timing data supplied by the machine supervisory computer 11.

A pair of section operator consoles 22 and 23 are connected to the individual section computers 13 and 14 respectively and to the valve blocks 17 and 18 respectively. The consoles 22 and 23 are used to make adjustments to the mechanism timing. For example, the actuation of a particular valve may be either advanced or retarded by the operator with the use of the console.

The section operator consoles 22 and 23 are also used to control the operating condition of the respective individual section. When an individual section is forming glassware, it is designated as being in the "run" condition and, when the section is not running, it is designated as being in the "safe" condition. The section operator consoles 22 and 23 each are provided with a machine start switch (not shown) for switching the respective individual section from the safe condition to the run condition and a machine stop switch (not shown) for switching the section from the run to the safe condition. When a section is in the safe condition, the forming mechanisms are stopped and in a position for easy access such that the mechanisms can be replaced or repaired. The operator can switch to a manual mode wherein the solenoids of the valve block can be individually controlled using a plurality of switches (not shown) which are provided in the section operator console.

Figure 2:
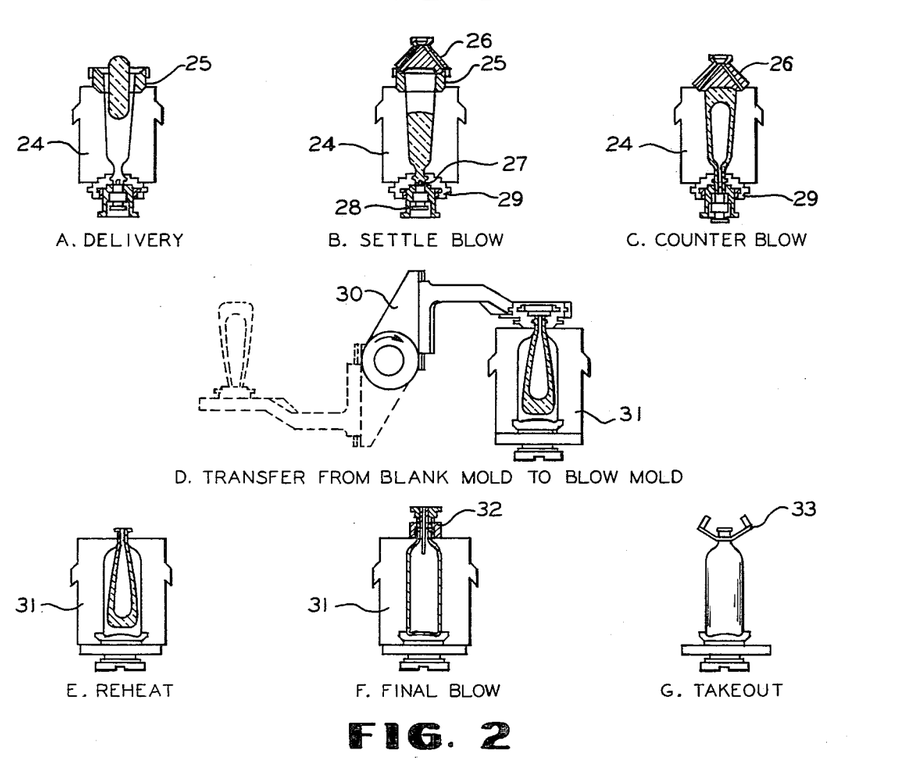
FIGS. 2a through 2g are schematic diagrams of the sequence of forming steps in one section of an IS machine.
Figure 3:
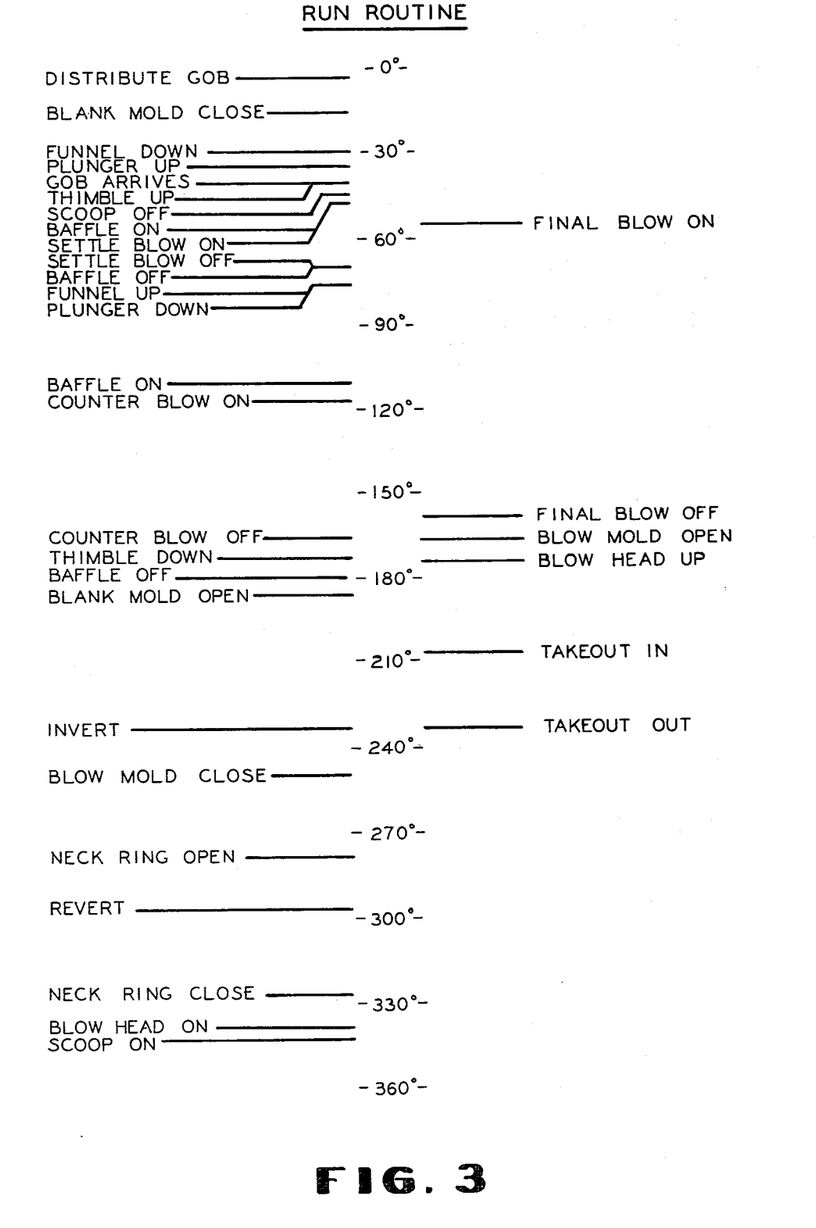
FIG. 3 is a timing diagram of a run routine which indicates the sequence and relative timing positions in a machine cycle at which the various glassware forming functions are performed.

There is shown in FIG. 2a through FIG. 2g schematic diagrams of the sequence of events for one cycle of an individual section of the glassware forming machine shown in FIG. 1. These steps are illustrative of the method of forming a typical article of glassware known as the blow and blow cycle. There is shown in FIG. 3 a timing diagram of the run routine which indicates the relative positions in the section cycle at which the control signals for the various glassware forming steps are generated when the section is in the run condition. It will be understood that there is a response time associated with the actuation of the forming means associated with each of the control signals. Furthermore, the timing of these steps depends upon the type of glassware being formed and steps can be added, deleted or repeated as necessary. Throughout the following discussion, the steps shown in FIG. 3 will be referred to in capital letters such as DISTRIBUTE GOB.

As was previously discussed, a continuous flow of molten glass is repetitively severed at a predetermined rate to produce a series of molten gobs. A gob distributor (not shown) sequentially distributes a separate gob to each individual section of the machine. As shown in FIG. 3, a scoop mechanism (not shown) is moved into position (SCOOP ON) near the end of the section cycle to receive a gob from the gob distributor and deliver the gob to the respective individual section at the beginning of the subsequent cycle. The distribution (DISTRIBUTE GOB) typically occurs sometime after the start of the section cycle at 0°. There is a travel time lapse between the time at which the gob is severed and the time at which the gob arrives at the blank station. As illustrated in FIG. 2a, the gob delivery step, during this travel time a blank mold 24 is moved into its closed position (BLANK MOLD CLOSE) and a funnel 25 is positioned on top of the mold 24 (FUNNEL DOWN) in order to guide the gob into the mold. A plunger 27, adjacent the bottom of the mold, is then moved up into position (PLUNGER UP). When the gob arrives (GOB ARRIVES), it falls through the funnel 25 and into the interior of the mold 24. At or about the same time that the gob arrives, a thimble 28 surrounding the plunger 27 is moved up into position (THIMBLE UP). The scoop mechanism is then moved out of position (SCOOP OFF).

In FIG. 2b, the settle blow step, a baffle 26 is positioned on top of the funnel 25 (BAFFLE ON). There are the plunger 27, a thimble 28 and a neck ring 29 adjacent the bottom of the mold 24. The plunger 27 extends through the thimble 28 which is enclosed by the neck ring 29. When the baffle 26 is in position, air under pressure is momentarily discharged into the top of the mold to force the molten glass into the mold and neck ring and around the plunger (SETTLE BLOW ON—SETTLE BLOW OFF) and then the baffle is removed (BAFFLE OFF). This is the settle blow step. In FIG. 2c, the counter blow step, the funnel is removed (FUNNEL UP) and the plunger 27 is retracted (PLUNGER DOWN) leaving a depression in the molten glass. Next, the baffle is positioned on top of the mold (BAFFLE ON) and counter blow air under pressure is introduced through the thimble and into the depression (COUNTER BLOW ON) to force the molten glass against the walls of the blank mold to produce a partially formed article of glassware referred to as a parison. The counter blow air is turned off (COUNTER BLOW OFF) and the thimble is moved down (THIMBLE DOWN). Then the baffle 26 is removed from the mold (BAFFLE OFF).

During the counter blow step, the body of the blank mold extracts sufficient heat from the parison to form a cooled skin thereon which is rigid enough to allow manipulation of the parison. In FIG. 2d, the invert or transfer from blank mold to blow mold step, the blank mold is opened (BLANK MOLD OPEN) and a transfer mechanism 30, attached to the neck ring 29, rotates the parison 180° (INVERT) into an open blow mold 31. The neck portion of the parison which has been positioned downward is now in the upward position. Next, the blow mold 31 is closed (BLOW MOLD CLOSE) and the neck ring is opened (NECK RING OPEN) and removed so that the parison is being supported at its neck portion by the blow mold. In this position, the reheat step, shown in FIG. 2e, takes place. The skin of the parison is reheated by the relatively hot interior of the parison and the parison becomes sufficiently soft for a final blowing step. The transfer mechanism 30 and the neck ring 29 are rotated back to the blow mold (REVERT) for the next parison to be formed.

In FIG. 2f, the final blow step, a blow head 32 is positioned on top of the blow mold 31 (BLOW HEAD ON). As was previously discussed, the scoop mechanism is moved into position (SCOOP ON) to receive the next gob. Air under pressure is introduced through the blow head 32 (FINAL BLOW ON) into the interior of the parison to force the parison into the shape defined by the blow mold which is the shape of the desired article of glassware. The blow air remains on while the walls of the blow mold absorb heat from the glass such that the glassware becomes stiff enough for handling. The blow air is then turned off (FINAL BLOW OFF) and the blow mold is opened (BLOW MOLD OPEN). The blow head is then removed (BLOW HEAD UP) such that the article of glassware is ready to be removed from the section.

In FIG. 2g, the takeout step, a takeout mechanism 33 is moved into position to grasp the article of glassware at its neck position (TAKEOUT IN). The takeout mechanism 33 then transfers (TAKEOUT OUT) the finished article of glassware to a dead plate (not shown) for further cooling and subsequent pushout onto a conveyor (not shown).

As illustrated in the timing diagram FIG. 3, the foregoing machine operation functions are performed in cycles of 360°. The forming process is a two stage process, wherein the first stage is performed at the blank station and the second stage is performed at the blow station. The respective machine functions are performed at the two stations simultaneously such that, during each machine cycle, a blank station will produce a partially formed article of glassware and a blow station will produce a finished article of glassware. Thus, while the blow station is performing the final blow function, the blank station is producing a partially formed article of glassware to be subsequently transferred to the blow station.

Figure 4:
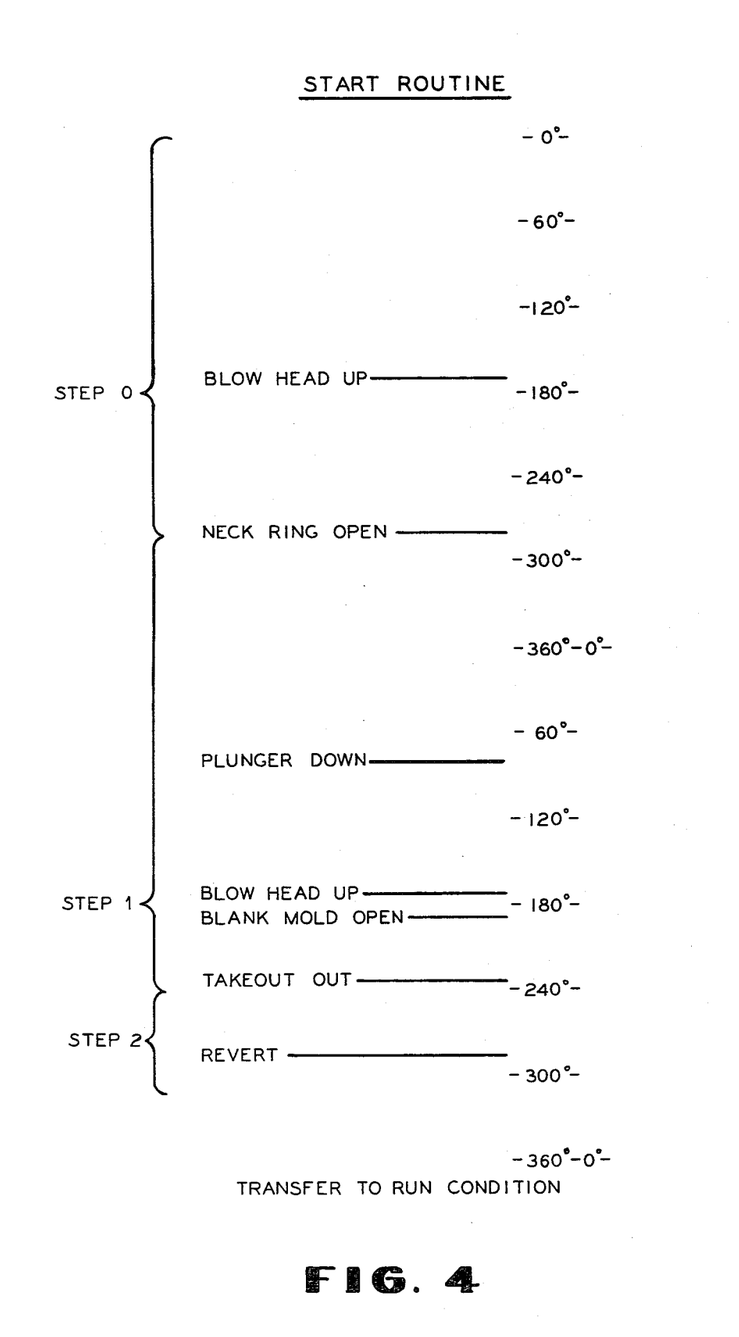
FIG. 4 is a timing diagram of a start routine which indicates the sequence and relative timing positions during the start routine at which the various glassware forming functions are performed.

If an individual section is in the safe condition and the start switch is actuated, the respective individual section computer will initiate a start routine wherein the various glassware forming mechanism are moved into positions such that control can be transferred to the previously described run routine. There is shown in FIG. 4 a timing diagram of the typical machine functions which are performed during a start routine.

The start routine is executed over a period of approximately two section cycles. It should be noted that the section can be started automatically without regard to the current positions of the forming mechanisms since the start routine is designed to prevent any equipment interferences. During the step 0 (zero) of the routine, the blow head is moved off the blow mold (BLOW HEAD UP) and the neck ring is then moved into its open position (NECK RING OPEN). During the step 1 of the routine, the plunger is retracted (PLUNGER DOWN), the blow head is held off the blow mold (BLOW HEAD UP), the blank mold is moved into its open position (BLANK MOLD OPEN) and the takeout mechanism is moved out of position (TAKEOUT OUT). During step 2, the transfer mechanism is moved into position on the blank mold side (REVERT). After the section position becomes equal to the degree value of REVERT, the respective section computer will transfer the section to the run condition. The section will remain in the run condition until the stop switch has been actuated.

If an individual section is in the run condition and the stop switch is actuated, the respective individual section computer will initiate a stop routine which controls an orderly shutdown of the section such that the section will then be in the safe condition. The stop routine is typically entered at 0° of the section cycle and is executed over a period of approximately two section cycles. There is shown in FIG. 5 a timing diagram of the typical machine functions which are performed over a period of approximately two successive section cycles to provide an orderly shutdown of the machine.

Step 0 in the stop routine is exactly the same as a cycle in the run routine except that the SCOOP ON and NECK RING CLOSE functions are disabled such that no more gobs of glass will be delivered to the section. Thus, during the step 0, the last parison will be formed and inverted while the next to last bottle will be blown and taken out. During step 1, the blank mold station functions are disabled while the last bottle is blown. During step 2, the last bottle is removed from the blow mold (TAKEOUT IN AND OUT) and the transfer arm is moved to the blow mold side (INVERT). At the end of step 2, all the glass has been cycled from the section and the various glassware forming mechanisms have been moved into a position such that the section is in the safe condition.

As previously mentioned, if a section is in the run condition and the stop switch is actuated, the stop routine will be entered when the machine position becomes 0° and the entire stop routine will be executed. The initial portion of the stop routine is concerned with cycling from the section the glass which is already present in the section while the final portion of the routine is concerned with moving the forming mechanisms into position such that the section will be in the safe condition. However, if no glass is present in the section and the stop switch is actuated, it is only necessary to execute the final portion of the stop routine. In accordance with the present invention, if the stop switch is actuated before at least one predetermined exit point in the start routine, the stop routine will be entered at an intermediate point such that only the machine functions in the stop routine subsequent to the intermediate point will be performed to shut down the section.

Figure 5:
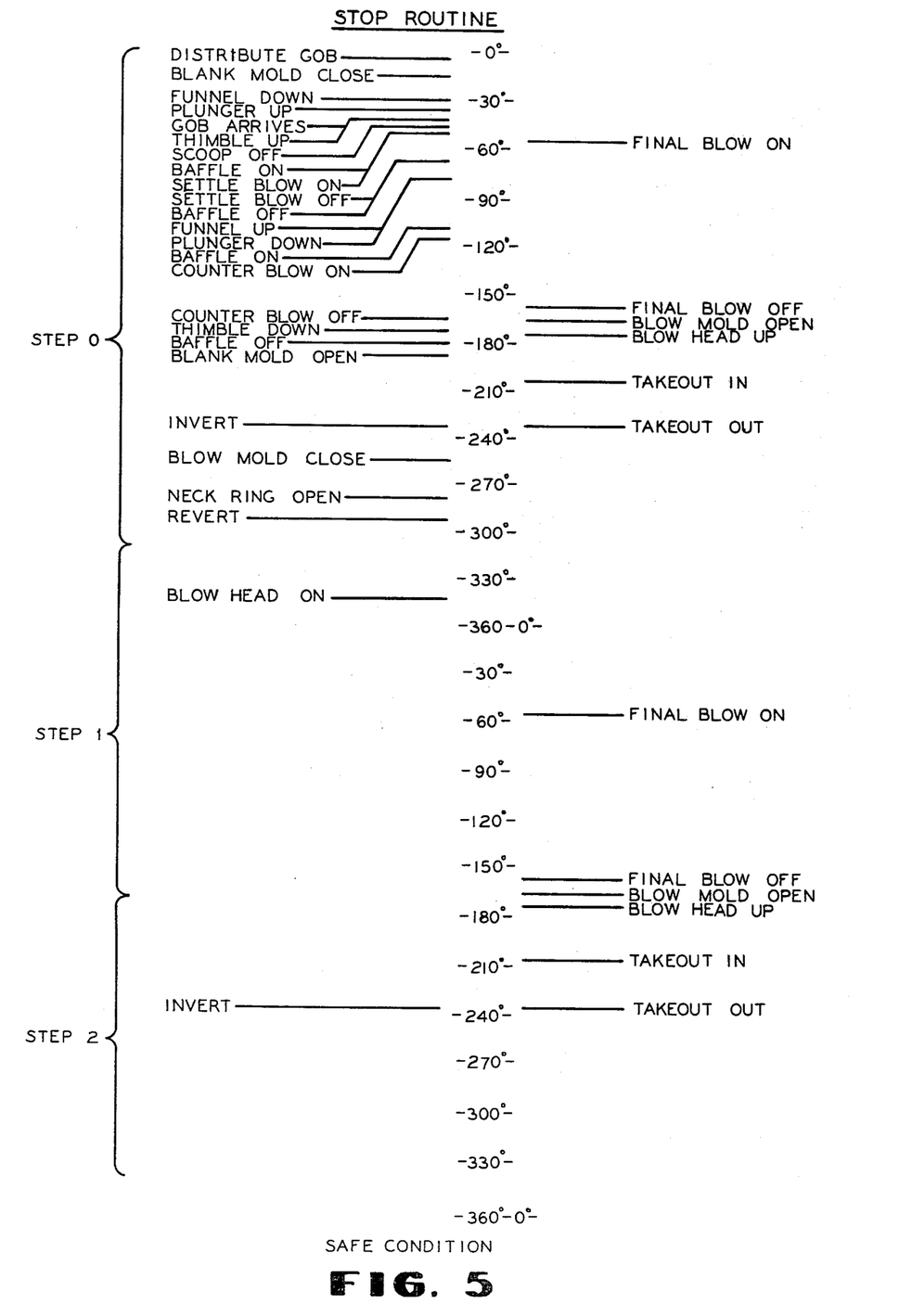
FIG. 5 is a timing diagram of a stop routine which indicates the sequence and relative timing positions during the stop routine at which the various glassware forming functions are performed.

Referring to FIG. 4 and FIG. 5, if the section is in the process of executing the start routine, no glass has been delivered to the section and the section can be stopped in an orderly sequence by entering step 2 of the stop routine, for example, after the BLOW MOLD OPEN function but before the BLOW HEAD UP function. It is not necessary to perform the functions in the stop routine prior to the BLOW HEAD UP function since there is no glass in the section which must be cycled out. Thus, if the stop routine is entered after the BLOW MOLD OPEN function, the only functions which are performed before the individual section is transferred to the safe condition are the BLOW HEAD UP function, the TAKEOUT IN function, the TAKEOUT OUT function and the INVERT function. When the section enters the safe condition, the blow head will be in the up position and the invert mechanism will be positioned on the blow mold side.

Figure 6:
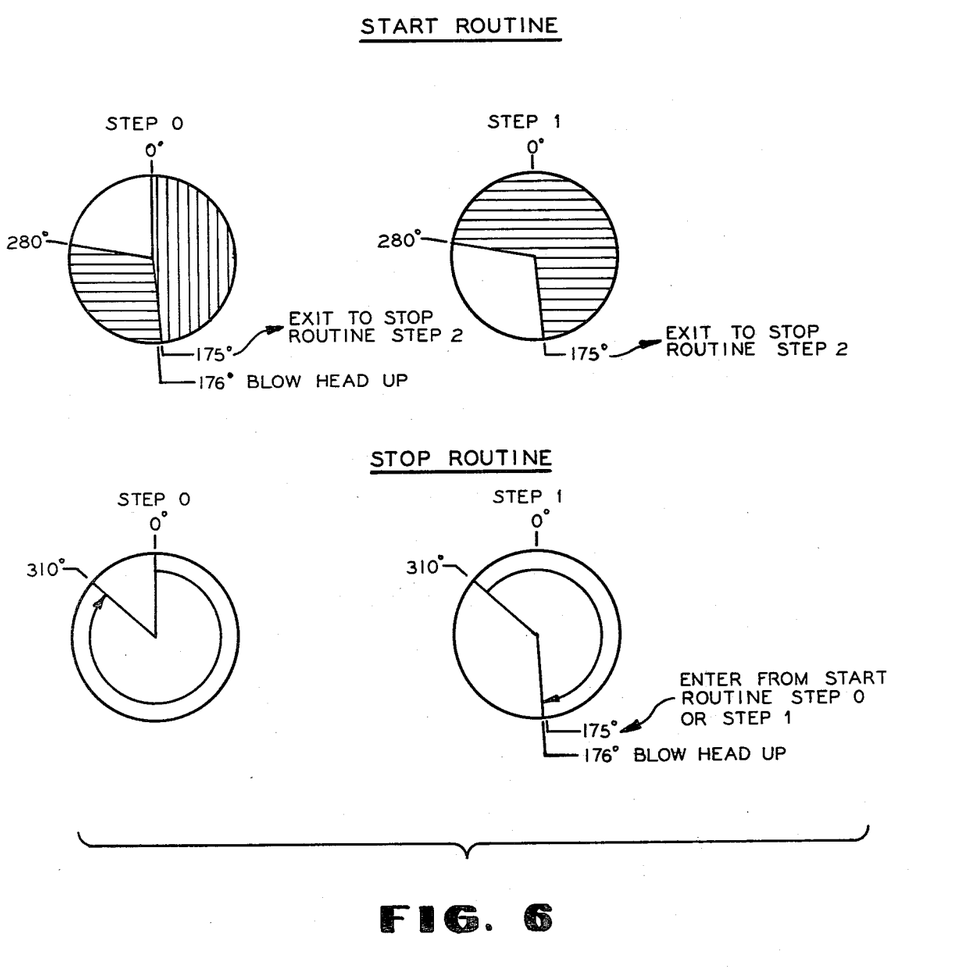
FIG. 6 is a set of circle diagrams for the start and stop routines showing an automatic stop during the automatic start of one section of an IS machine in accordance with the present invention.

In accordance with the present invention, if a section is in the step 0 of the start routine and the stop switch is actuated before the BLOW HEAD UP function, the respective individual section computer will enter step 2 of the stop routine after the section position becomes equal to the degree value of the BLOW MOLD OPEN function. Thus, as shown in FIG. 6, if the degree value of the BLOW MOLD OPEN function is 175°, for example, and the stop switch is actuated between 0° and 175° (the vertically lined area) of step 0 of the start routine, step 2 of the stop routine will be entered after the section position becomes 175° as shown in FIG. 6. If the stop switch is not actuated before the BLOW MOLD OPEN function of the step 0, but within 359° after that particular function (176° to 280° of step 0 and 280° to 175° of step 1, the horizontally lined area of FIG. 6, the section computer will then enter the step 2 of the stop routine when the section position again becomes equal to the degree value of the BLOW MOLD OPEN function or 175°. However, if a section is executing the start routine and the stop switch is actuated after 175° of the step 1, the step 0 of the stop routine, shown in FIG. 6, will be entered at the beginning when the section position returns to 0°. It will be appreciated that a programmed stop, whether initiated during the start routine or when the machine is in the "run" condition, does not effect an immediate or emergency stop of the machine. Such an emergency stop functions only to release anything which may be caught in the molds, neck ring, or blow head. Rather, a programmed stop is initiated only at a predetermined exit point in the start sequence or the "run" cycle, whether or not there is glass in the machine, so as to place the forming mechanisms in positions for ease of maintenance.

Figure 7:
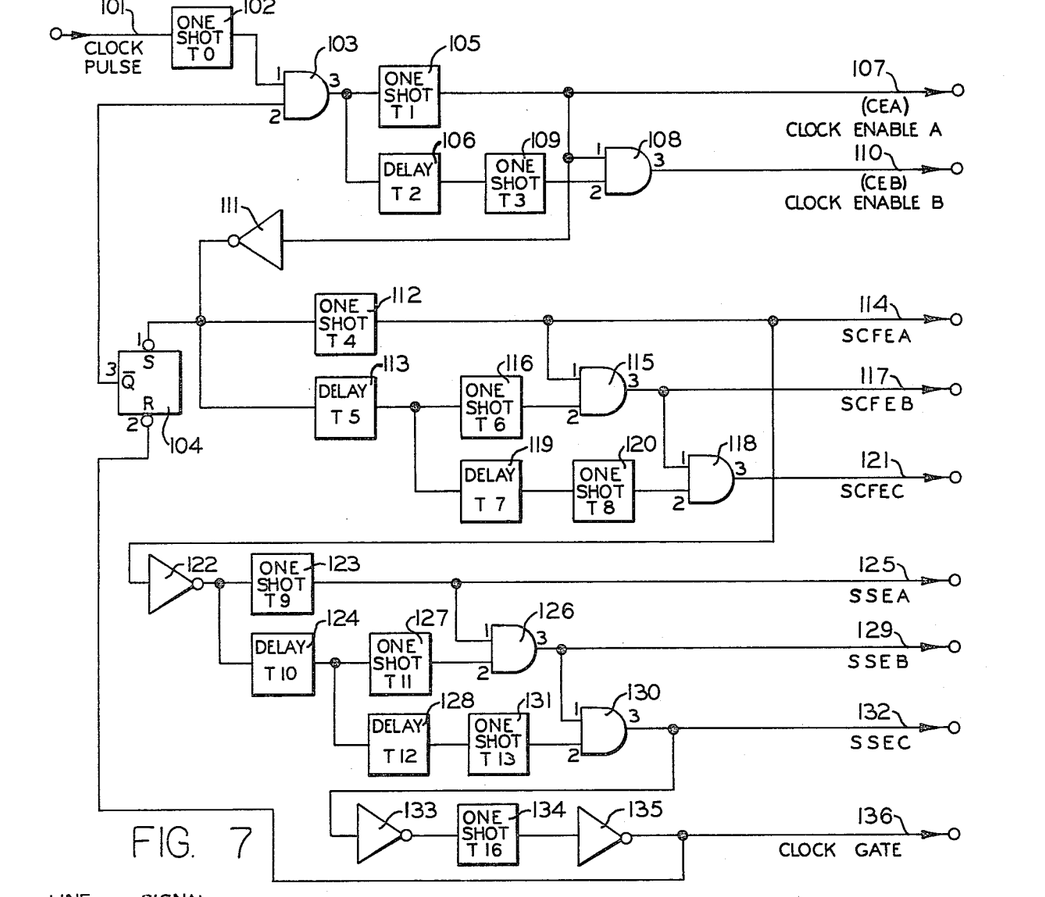
FIGS. 7, 9 and 10 are schematic diagrams of circuitry for effecting an automatic stop during the automatic start of a glassware forming machine in accordance with the present invention.
Figure 9:
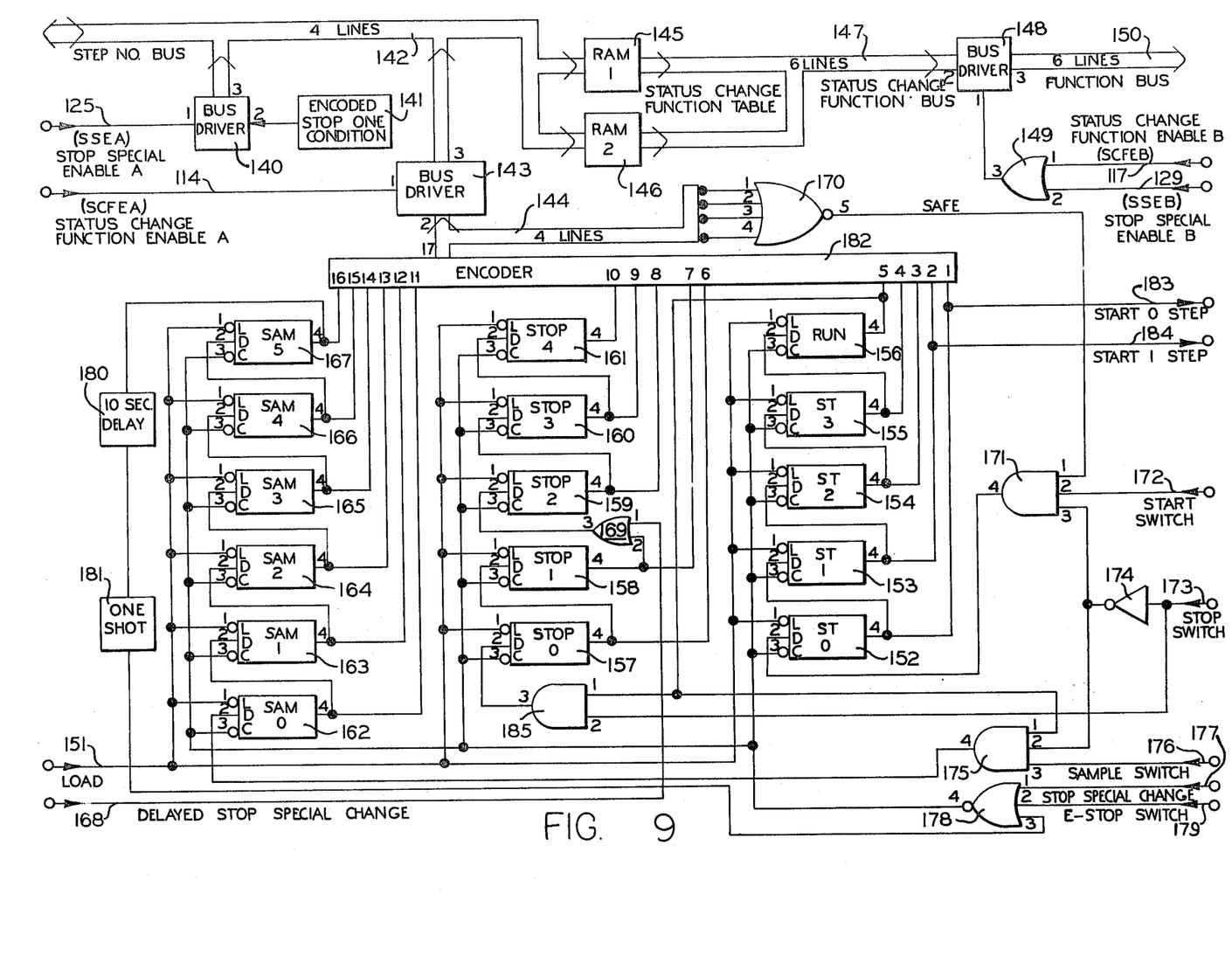
Figure 10:
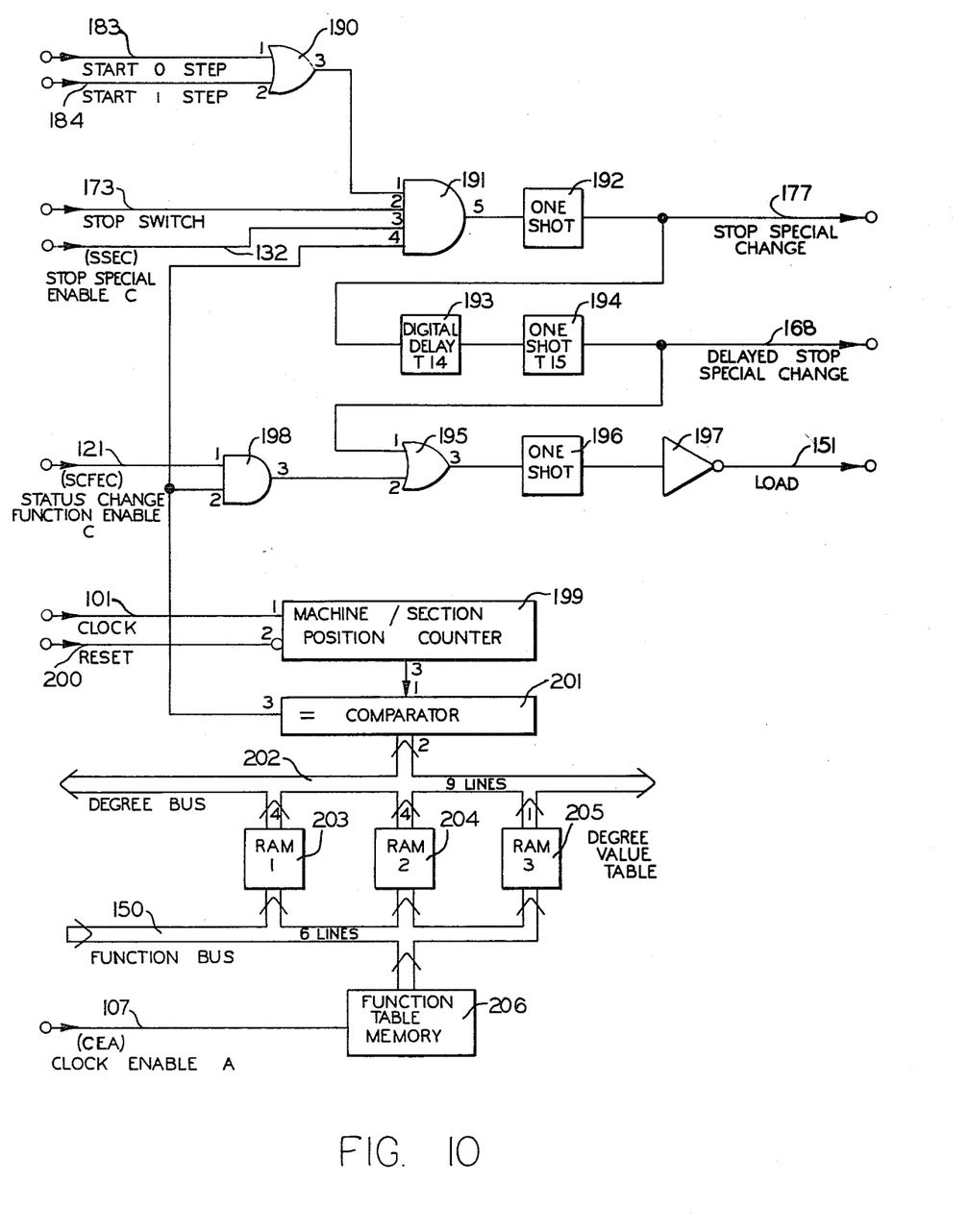

There is shown in FIGS. 7, 9 and 10 a logic circuit for controlling an automatic glassware forming machine in an automatic stop routine in accordance with the present invention. The circuit of FIG. 7 generates various timing pulses which are utilized in the circuits of FIGS. 9 and 10.

Clock pulses from the timing pulse generator 12 of FIG. 1 are an input on a clock pulse line 101 to the circuit of FIG. 7. The line 101 is connected to an input of a one shot multivibrator 102. The leading edge of the clock pulse triggers the multivibrator 102 to generate a timing pulse T0 at an output which is connected to an input 103-1 of an AND gate 103. The T0 timing pulse and all other pulses generated by the circuit of FIG. 7 are shown in a wave form diagram FIG. 8. The AND 103 has another input 103-2 connected to an inverting output 104-3 of a flip flop 104. The AND 103 has an output 103-3 connected to an input of a one shot multivibrator 105 and an input of a time delay 106.

The one shot 105 has an output connected to a Clock Enable A (CEA) line 107 and to an input 108-1 of an AND 108. The time delay 106 has an output connected to an input of a one shot multivibrator 109 which has an output connected to an input 108-2 of the AND 108. The AND 108 has an output 108-3 connected to a Clock Enable B (CEB) line 110. The output of the one shot 105 is also connected through an inverter 111 to a set input 104-1 of the flip flop 104, an input of a one shot multivibrator 112, and an input of a time delay 113. The one shot 112 has an output connected to a Status Change Function Enable A (SCFEA) line 114 and an input 115-1 of an AND 115. The delay 113 has an output connected to an input of a one shot multivibrator 116 which has an output connected to an input 115-2 of the AND 115.

The AND 115 has an output 115-3 connected to a Status Change Function Enable B (SCFEB) line 117 and an input 118-1 of the AND 118. The output of the delay 113 is connected to an input of a time delay 119 which has an output connected to an input of a one shot multivibrator 120. The one shot 120 has an output connected to an input 118-2 of the AND 118. The AND 118 has an output 118-3 connected to a Status Change Function Enable C (SCFEC) line 121.

The output of the one shot 112 is also connected through an inverter 122 to an input of a one shot multivibrator 123 and an input of a time delay 124. The one shot 123 has an output connected to a Stop Special Enable A (SSEA) line 125 and an input 126-1 of an AND 126. An output of the time delay 124 is connected to an input of a one shot multivibrator 127 and an input of the time delay 128. The one shot 127 is an output connected to an input 126-2 of the AND 126. The AND 126 has an output 126-3 connected to a Stop Special Enable B (SSEB) line 129 and an input 130-1 of an AND 130. The time delay 128 has an output connected to an input of a one shot multivibrator 131 having an output connected to an input 130-2 of the AND 130. The AND 130 has an output 130-3 connected to a Stop Special Enable C (SSEC) line 132.

The output 130-3 of the AND 130 is connected through an inverter 133 to an input of a one shot multivibrator 134. The one shot 134 has an output connected through an inverter 135 to a Clock Gate line 136 and to a reset input 104-2 of the flip flop 104.

Figure 8:
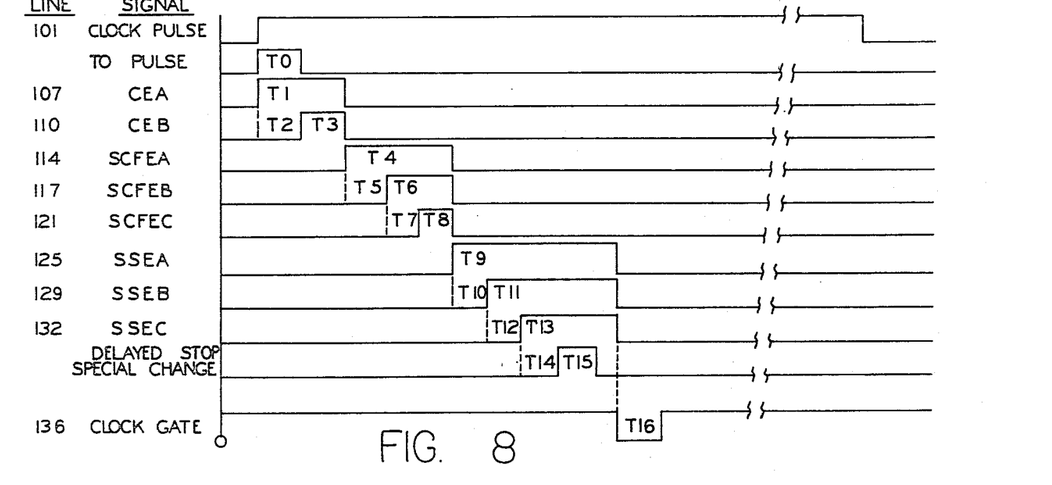
FIG. 8 is a wave form diagram of signals generated in the circuitry shown in FIGS. 7, 9 and 10.

Referring to FIGS. 7 and 8, the leading edge of each clock pulse on the line 101 triggers the one shot 102 which generates a timing pulse having a duration T0. If the output 104-3 of the flip flop 104 is at a logic "1", the AND 103 will be enabled at the input 103-2 to generate the T0 pulse at the input of the one shot 105 and the input of the delay 106. The one shot 105 is triggered by the leading edge of the T0 pulse to generate a pulse having a duration T1 on the line 107. The delay 106 delays the leading edge of the T0 pulse a time T2 at the end of which the one shot 109 is triggered to generate a pulse having a duration T3. The T1 pulse from the one shot 105 enables the AND 108 at the input 108-1 to generate the T3 pulse on the line 110.

The T1 pulse from the one shot 105 is inverted by the inverter 111 to set the flip flop 104 which changes the signal at its output 104-3 from a logic "1" to a logic "0". The trailing edge of the inverted T1 pulse triggers the one shot 112 and the time delay 113. The one shot 112 generates a pulse having a duration T4 on the Status Change Function Enable A (SCFEA) line 114. After a time delay of a duration T5, the delay 113 generates the inverted trailing edge of the T1 pulse at the inputs of the one shot 116 and the time delay 119. The one shot 116 is responsive to the leading edge of the time delay pulse to generate a pulse having a duration T6 at the input 115-2 of the AND 115. The T4 pulse from the one shot 112 enables the AND 115 at the input 115-1 to generate the T6 pulse on the Status Change Function Enable B (SCFEB) line 117. The delayed pulse from the time delay 113 is further delayed a time T7 by the time delay 119 before triggering the one shot 120. The one shot 120 generates a pulse having a duration T8 to the input 118-2 of the AND 118. The T6 pulse generated by the AND 115 enables the AND 118 at the input 118-1 to generate the T8 pulse on the Status Change Function Enable C (SCFEC) line 121.

The T4 pulse is inverted by the inverter 122 such that the trailing edge triggers the one shot 123 and the time delay 124. The one shot 123 generates a pulse having a duration T9 on the Stop Special Enable A (SSEA) line 125. After a delay of a duration T10, the time delay 124 generates a pulse to the input of the one shot 127 and the input of the time delay 128. The one shot 127 responds by generating a pulse having a duration T11 at the input 126-2 of the AND 126. The pulse T9 enables the AND 126 at the input 126-1 to pass the T11 pulse which is generated on the Stop Special Enable B (SSEB) line 129. The time delay 128 delays for a period T12 before triggering the one shot 131 which generates a pulse having a duration T13 at the input 130-2 of the AND 130. The T11 pulse enables the AND 130 at the input 130-1 to generate the T13 pulse on the Stop Special Enable C (SSEC) line 132.

The T13 pulse generated by the AND 130 is inverted by the inverter 133 such that the trailing edge triggers the one shot 134. The one shot 134 generates a pulse having a duration T16 which is inverted by the inverter 135 and generated on the Clock Gate line 136. The clock gate signal also is applied to the reset input 104-2 to reset the flip flop 104. The flip flop 104 changes the signal at the output 104-3 from a logic "0" to a logic "1" to enable the AND 103 to pass the next T0 pulse generated by the one shot 102. The series of pulses shown in FIG. 8, with the exception of the pulse generated on a Delayed Stop Special Change line 168, is generated each time a clock pulse is generated on the line 101.

As explained above, 360 clock pulses or some multiple thereof comprise one machine cycle. For the purpose of discussing the circuitry shown in FIGS. 9 and 10, it will be assumed that 360 clock pulses comprise one machine cycle and that the machine has only one section. It will be readily apparent to those skilled in the art that the present invention can be utilized with each section of a multi-section glassware forming machine.

There is shown in FIGS. 9 and 10, circuitry for controlling a glassware forming machine in an automatic stop routine in accordance with the present invention. The SSEA signal line 125 is connected to an enable input 140-1 of a bus driver 140. A signal generating means 141 generates an encoded stop one condition signal to an input 140-2 of the bus driver 140. The generating means can be comprised of any conventional elements such as a set of binary coded switches which generate the encoded stop one condition as a four bit signal representing the Stop One step number. The bus driver 140 has four outputs 140-3 connected to a four bit step number bus 142. The bus 142 includes four bidirectional signal lines (not shown separately).

The SCFEA signal line 114 is connected to an enable input 143-1 of a bus driver 143. The bus driver 143 has four inputs 143-2 connected to a bus 144. The bus driver 143 has four outputs 143-3 which are connected to the step number bus 142. All four lines of the bus 142 are also connected to four inputs of each of a pair of random access memories (RAMs), RAM1 145 and RAM2 146. The RAMs 145 and 146 comprise a status change function table. The RAM 145 has two outputs and the RAM 146 has four outputs connected to a six line status change function bus 147. The bus 147 is connected to six inputs 148-2 of a bus driver 148. The SCFEB signal line 117 is connected to an input 149-1 of an OR gate 149. The SSEB signal line 129 is connected to an input 149-2 of the OR 149 which has an output 149-2 connected to an enable input 148-1 of the bus driver 148. The bus driver 148 has six outputs 148-3 which are connected to a six line function bus 150.

A Load signal line 151 is connected to a load input of each of sixteen flip flops: a load input 152-1 of a Start Zero (ST 0) flip flop 152; a load input 153-1 of a Start One (ST 1) flip flop 153; a load input 154-1 of a Start Two (ST 2) flip flop 154; a load input 155-1 of a Start Three (ST 3) flip flop 155; a load input 156-1 of a Run flip flop 156; a load input 157-1 of a Stop Zero (STOP 0) flip flop 157; a load input 158-1 of a Stop One (STOP 1) flip flop 158; a load input 159-1 of a Stop Two (STOP 2) flip flop 159; a load input 160-1 of a Stop Three (STOP 3) flip flop 160; a load input 161-1 of a Stop Four (STOP 4) flip flop 161; a load input 162-1 of a Sample Zero (SAM 0) flip flop 162; a load input 163-1 of a Sample One (SAM 1) flip flop 163; a load input 164-1 of a Sample Two (SAM 2) flip flop 164; a load input 165-1 of a Sample Three (SAM 3) flip flop 165; a load input 166-1 of a Sample Four (SAM 4) flip flop 166; and a load input 167-1 of a Sample Five (SAM 5) flip flop 167. The flip flops form a status condition latch which generates an electrical representation of the machine status with respect to the start, run, stop and sample routines. A Delayed Stop Special Change signal line 168 is connected to an input 169-1 of an OR gate 169. The OR 169 has an input 169-2 connected to an output 158-4 of the flip flop 158 and has an output 169-3 connected to a data input 159-2 of the flip flop 159.

The four lines of the bus 144 are connected to inputs 170-1, 170-2, 170-3 and 170-4 of a NOR gate 170. The NOR 170 has an output 170-5 connected to an input 171-1 of an AND gate 171. A Start Switch signal line 172 is connected to an input 171-2 and a Stop Switch signal line 173 is connected through an inverter 174 to an input 171-3 of the AND 171. The AND 171 has an output 171-4 which is connected to a data input 152-2 of the flip flop 152. An output 156-4 of the flip flop 156 is connected to an input 175-1 of an AND gate 175. An output of the inverter 174 is connected to an input 175-2 and a Sample Switch signal line 176 is connected to an input 175-3 of the AND 175. The AND 175 has an output 175-4 connected to a data input 162-2 of the flip flop 162.

A Stop Special Change signal line 177 is connected to an input 178-1 of a NOR gate 178. An E (emergency) Stop Switch signal line 179 is connected to an input 178-2 of the NOR 178. An output 167-4 of the flip flop 167 is connected to an input of a ten second delay 180 having an output connected to an input of a one shot multivibrator 181. An output of the one shot 181 is connected to an input 178-3 of the NOR 178 which has an output 178-4 connected to a clear input 152-3 of the flip flop 152 and clear inputs of all the other flip flops 153 through 167.

The flip flop 152 has an output 152-4 connected to a data input 153-2 of the flip flop 153, to an input 182-1 of an encoder 182, and to a Start Zero Step signal line 183. The flip flop 153 has an output 153-4 connected to a data input 154-2 of the flip flop 154, to an input 182-2 of the encoder 182, and to a Start One Step signal line 184. The flip flop 154 has an output 154-4 connected to a data input 155-2 of the flip flop 155 and to an input 182-3 of the encoder 182. The flip flop 155 has an output 155-4 connected to a data input 156-2 of the flip flop 156 and to an input 182-4 of the encoder 182.

The output 156-4 of the flip flop 156 is connected to an input 182-5 of the encoder 182 and to an input 185-1 of an AND gate 185. The AND 185 has an input 185-2 connected to the Stop Switch signal line 173 and an output 185-3 connected to a data input 157-2 of the flip flop 157. The flip flop 157 has an output 157-4 connected to a data input 158-2 of the flip flop 158 and to an input 182-6 of the encoder 182. The output 158-4 of the flip flop 158 is connected to an input 182-7 of the encoder 182.

The flip flop 159 has an output 159-4 connected to a data input 160-2 of the flip flop 160 and to an input 182-8 of the encoder 182. The flip flop 160 has an output 160-4 connected to a data input 161-2 of the flip flop 161 and an input 182-9 of the encoder 182. The flip flop 161 has an output 161-4 connected to an input 182-10 of the encoder 182.

The flip flop 162 has an output 162-4 connected to a data input 163-2 of the flip flop 163 and to an input 182-11 of the encoder 182. The flip flop 163 has an output 163-4 connected to a data input 164-2 of the flip flop 164 and to an input 182-12 of the encoder 182. The flip flop 164 has an output 164-4 connected to a data input 165-2 of the flip flop 165 and to an input 182-13 of the encoder 182. The flip flop 165 has an output 165-4 connected to a data input 166-2 of the flip flop 166 and to an input 182-14 of the encoder 182. The flip flop 166 has an output 166-4 connected to a data input 167-2 of the flip flop 167 and to an input 182-15 of the encoder 182. The output 167-4 of the flip flop 167 is connected to an input 182-16 of the encoder 182. The encoder 182 is a sixteen lines to four lines encoder which has a four line output 182-17 connected to the bus 144.

Referring to FIG. 10, there is shown the Start Zero Step signal line 183 connected to an input 190-1 of an OR gate 190. The Start One Step signal line 184 is connected to an input 190-2 of the OR 190 which has an output 190-3 connected to an input 191-1 of an AND gate 191. The Stop Switch signal line 173 is connected to an input 191-2 and the SSEC signal line 132 is connected to an input 191-3 of the AND 191. The AND 191 has an output 191-5 which is connected to an input of a one shot multivibrator 192. The one shot 192 has an output connected to the Stop Special Change signal line 177 and an input of a digital delay 193 which has a time delay of the duration T14 shown in FIG. 8. The delay 193 has an output which is connected to an input of a one shot multivibrator 194 which generates a signal pulse having the duration T15 on the Delayed Stop Special Change signal line 168. The output of the one shot 194 is also connected to an input 195-1 of an OR gate 195. The OR 195 has an output 195-3 connected to an input of a one shot multivibrator 196 which has an output connected through an inverter 197 to the Load signal line 151.

The SCFEC signal line 121 is connected to an input 198-1 of an AND gate 198. The AND 198 has an output 198-3 connected to an input 195-2 of the OR 195. The clock pulse signal line 101 is connected to a count input 199-1 of a machine/section position counter 199. A reset pulse signal line 200 is connected to an input 199-2 of the counter 199. The counter 199 has an output 199-3 which is an input to a first set of inputs 201-1 of a comparator 201. The comparator 201 has a second set of inputs 201-2 connected to a nine line degree bus 202. The comparator has an "equal" output 201-3 at which is generated a signal when the output of the counter 199 equals the degree value on the bus 202. The output 201-3 is connected to an input 198-2 of the AND 198 and an input 191-4 of the AND 191.

The six line function bus 150 is connected to a degree value table represented as three RAMs, RAM1 203, RAM2 204, and RAM3 205. The RAM1 203 has four output lines connected to the degree bus 202. The RAM2 204 has four outputs connected to the degree bus 202 and the RAM3 205 has one output line connected to the degree bus 202. The function bus 150 is also connected to outputs of a function table memory 206 which is a stack-type memory of the order in which functions are to be performed. The CEA signal line 107 is connected to an enable input of the memory 206.

Typically, there is generated on the line 101 one clock pulse for each degree of rotation in the machine cycle or each section cycle of a multi-section machine. The CEA pulse is generated on the line 107 to enable the function table memory 206 to generate a six bit function signal on the function bus line 150. The function signal represents the next function to be turned on or off in the sequence of operating events and the cycle for the machine. The function signal is applied to the degree value table RAMs 203, 204 and 205 which generate the degree value for the function as a nine bit degree signal on the degree bus 202. This degree value represents the position in the machine cycle at which the function is to be performed. After 360°, the reset pulse on the line 200 resets the counter 199 to zero.

If the value of the signals on the degree bus 202 is equal to the value of the machine cycle position generated by the counter 199, a logic "1" signal is generated from the output 201-3 to the AND 198 and the AND 191. The function signal is also utilized to determine the valve to be operated, but such circuitry is not part of the present invention and will not be discussed here.

The flip flops 152 through 167 generate the status condition signal to the encoder 182. If the machine is in the "safe" condition, all of the inputs of the NOR 170 will be at logic "0" to generate a logic "1" at the input 171-1 of the AND 171. If the start switch is turned on and the stop switch is turned off, all of the inputs to the AND 171 will be at logic "1" to generate a logic "1" signal at the data input 152-2 of the flip flop 152. When the logic "0" signal is generated on the Load line 151, the flip flop 152 will be loaded with the logic "1" data bit to generate a logic "1" signal at the output 152-4 indicating that the START 0 step of the start routine has been entered. The start switch is then released to remove the logic "1" signal from the input 152-2. The next Load signal will load the logic "1" output from the flip flop 152 into the flip flop 153 and load the flip flop 152 with a logic "0". Thus, the encoder 182 will generate an output indicating that the START 1 step of the start routine has been entered. Subsequent Load signals will transfer the logic "1" signal to the flip flops 154 and 155 to complete the start routine and then to the flip flop 156 to enter the run routine.

If the machine is in the run routine, and the stop switch is actuated, both inputs to the AND 185 will be at logic "1" to generate a logic "1" at the data input 157-2. When the Load signal is generated, the flip flop 157 will be loaded with a logic "1" indicating that the STOP 0 step of the stop routine has been entered. Subsequent Load signals will transfer the logic "1" signal to the flip flops 158, 159, 160 and 161 in turn. The next Load signal will set the flip flop 161 to logic "0" and all inputs to the encoder 182 will be at logic "0". The encoder 182 then generates all logic "0" signals and the NOR 170 generates the logic "1" safe signal indicating that the machine has reached the safe condition.

If the machine is in the run condition, the stop switch is not actuated, and the sample switch is actuated, all of the inputs to the NAND 175 will be at logic "1" to generate a logic "1" at the data input 162-2 of the flip flop 162. When the Load signal is generated, the flip flop 162 will be loaded with a logic "1" signal to indicate that the SAMPLE 0 step of the sample routine has been entered. Subsequent Load signals will transfer the logic "1" signal through the flip flops 163 through 167 to sequence the machine through the steps of the sample routine. The logic "1" signal generated by the flip flop 167 generates a pulse from the one shot 181 after a ten second delay. This pulse is changed to a logic "0" pulse by the NOR 178 to clear all of the flip flops. The Stop Special Change signal on the line 177 or the E-Stop signal on the line 179 will also clear all the flip flops.

As stated above, each clock pulse initiates the timing pulse sequence shown in FIG. 8. The one shot 102 generates the T0 pulse which triggers the one shot 105 to generate the T1 pulse as the CEA pulse on the line 107. The CEA pulse enables the function table memory 206 to generate the six bit function signal representation of the next function to be turned on or off on the function bus line 150. The degree value table RAMs 203, 204 and 205 generate the degree value for the function as a nine bit degree signal on the degree bus 202 after a suitable data settle dealy time T2. A valve bus (not shown) is loaded with the address of the valve output bit and word and the section status bits bus (not shown) is loaded with start, run, stop or sample enable/disable bits.

After the delay T2, the CEB pulse is generated in the line 110 to enable a valve which is to be turned on or off. Assuming that the degree bus data is equal to the machine position as generated by the counter 199, and the valve bus data is not zero, then the section status bits bus data (not shown) is ANDed with the section status condition data input to the encoder 182. If the result is a non-zero condition, then the corresponding valve is turned "on" if the function bus zero bit is logic "0", or "off" if the function bus zero bit is logic "1". At the end of the CEB signal, the SCFEA signal is generated on the line 114 to enable the bus driver 143 to generate the encoded status condition signals on the step number bus 142. The encoded status condition signals address the status change function table RAMs 145 and 146 which generate a status change function signal on the bus 147. The SCFEB signal is then generated on the line 117 after a data settle delay T5 and is passed through the OR 149 to enable the bus driver 148 to generate the status change function signals on the function bus 150. The signals on the function bus address the degree value table RAMs 203, 204, and 205 which generate a degree value for the status change function on the degree bus 202.

If the degree value for the status change function is equal to the machine/section position as generated by the counter 199, the comparator 201 generates a signal at the output 201-3 to the AND 198 and the AND 191. Then the SCFEC signal is generated on the line 121 after a data settle delay T7 placing both inputs to the AND 198 at logic "1" to generate a logic "1" signal through the OR 195 to trigger the one shot 196. The one shot 196 generates a pulse which is inverted by the inverter 197 to generate the load signal on the line 151. The load signal on the line 151 causes each of the flip flops 152 through 167 to load any data appearing at their data inputs. This data may have been generated by start, stop or sample switch inputs for a previous section status condition which is routed to an input for the purpose of stepping to the next step. For example, the start zero flip flop 152 requires that the start switch be turned on to generate a signal on the line 172, that the stop switch be turned off to generate a signal on the line 173 through the inverter 174, and that the section status condition be a safe condition which will generate a logic "0" at all the inputs to the NOR 170 to generate a logic "1" at the input 171-1. Then the AND 171 will generate a logic "1" signal at the data input 152-2 of the flip flop 152. The stop zero step input requires that the run flip flop 156 be set to generate a logic "1" signal at its output 156-4, and that the stop switch be turned on to generate a signal on the line 173. The sample zero step requires that the flip flop 156 be generating a logic "1" signal at its output 156-4, that the stop switch be turned off to generate a logic "1" from the inverter 174, and that the sample switch be turned on to generate a logic "1" signal on the line 176. If the stop four flip flop 161 is set and its corresponding status change function degree value is equal to the machine position, then all of the flip flops will be loaded with a logic "0" to generate a safe signal from the NOR 170.

When the SSEA signal is generated on the line 125, the bus driver 140 is enabled to generate the encoded stop one condition signal on the step number bus 142. The step number bus signal addresses the status change function table RAMs 145 and 146 to generate a status change function signal on the bus 147. The SSEB signal is then generated on the line 121 after a data settle delay T10 and is passed by the OR 149 to enable the bus driver 148 to generate the status change function signal for the encoded stop one condition on the function bus 150. The signals on the function bus 150 address the degree value table RAMs 203, 204 and 205 which generate the degree value of the step change function for the encoded stop one condition on the degree bus 202. When this degree value is equal to the machine position, the comparator 201 generates a logic "1" signal at the output 201-3 to the AND 191.

If the section status condition is either a start zero or a start one step which generates a logic "1" at the input 191-1, and the stop switch is set to generate a logic "1" on the line 173, then the SSEC signal on the line 132 will cause the AND 191 to generate a logic "1" signal at the output 191-5 to trigger the one shot 192. The one shot 192 generates the Stop Special Change signal on the line 177 to the NOR 178. The NOR 178 generates a logic "0" signal to clear all of the flip flops 152 through 167. The Stop Special Change signal on the line 177 also triggers the one shot 194 after the delay T14 to generate the Delay Stop Special Change signal on the line 168. The Delay Stop Special Change signal on the line 168 is passed by the OR 169 to generate a data signal at the data input 159-2. The Delay Stop Special Change signal triggers the one shot 196 which generates the Load signal on the line 151 to load the flip flop 159 with the data signal. Thus, the start sequence is exited and the stop sequence is initiated at the Stop 2 step by the encoded stop one condition. The operation of the circuitry shown in FIGS. 7, 9 and 10 for controlling the automatic exit of the machine from the step zero or step one of the start routine to the step two of the stop routine is the equivalent of the operation of the computer as illustrated in FIGS. 6a through 6e. However, it should be noted that the circuit of FIG. 9 includes one additional start step, Start 3, and two additional stop steps, Stop 3 and Stop 4, embodied in the flip flops 155, 160 and 161. If the Start 3 step change function is the same as the Start 2 step change function, the circuit will ripple through when the Load signal is generated. The STOP 3 and STOP 4 steps can be operated in the same manner such that the start and stop routines each have only three steps as shown in FIGS. 6a through 6e. The extra steps are provided for other forming processes which require additional start and stop functions.

In summary, the present invention concerns an apparatus and a method for controlling a machine for forming articles of glassware from gobs of molten glass. The machine includes forming means responsive to a plurality of control signals for forming an article of glassware from each one of the gobs of molten glass in a cycle predetermined series of forming steps wherein each machine cycle has at least one point at which a stop routine is initiated in response to a machine stop signal. The apparatus comprises a control means including means for generating a machine start signal and a machine stop signal, means responsive to the generation of the machine start signal for generating a first group of the control signals for controlling the forming means in a start routine to place the machine in a condition for performing the cyclic predetermined series of forming steps of the "run" condition and means responsive to the generation of the machine stop signal when the machine is in the "run" condition for generating a second group of the control signals for controlling the forming means in a first stop routine to place the machine in a "safe" condition. The control means also includes means responsive to the generation of the stop signal during the start routine for exiting the start routine at a predetermined exit point and entering a second stop routine for generating a third group of the control signals to place the machine in the "safe" condition. The second stop routine can be the remainder of the first stop routine after a predetermined entry point.

The method comprises generating a machine start signal, generating a first group of control signals in response to the machine start signal for controlling the forming means in a start routine to place the machine in a condition for performing the predetermined series of forming steps of the "run" condition, generating a machine stop signal, generating a second group of the control signals for controlling the forming means in a first stop routine to place the machine in a "safe" condition in response to the generation of the machine stop signal when the machine is in the "run" condition and generating a third group of the control signals at a predetermined exit point in the start routine for controlling the forming means in a second stop routine to place the machine in a "safe" condition in response to the generation of the stop signal during the start routine. The point corresponds to an entry point in the first stop routine and the third group of control signals is the remainder of the second group of control signals after the entry point.

In accordance with the provisions of the patent statutes, the principle and mode of operation of the invention have been explained in its preferred embodiment. However, it must be understood that the invention may be practiced otherwise than as specifically illustrated and described without departing from its spirit or scope.

What is claimed is:

1. In a machine for forming articles of glassware from gobs of molten glass, the machine including forming means responsive to a plurality of control signals for controlling the machine in a "run" condition for forming an article of glassware from each one of the gobs of molten glass in a cyclic predetermined series of forming steps wherein each machine cycle has at least one point at which a stop routine is initiated in response to a machine stop signal, a control means comprising:
    means for generating a machine start signal and a machine stop signal;
    means responsive to the generation of said machine start signal for generating a first group of control signals for controlling the forming means in a start routine to place the machine in a condition for performing the cyclic predetermined series of forming steps of the "run" condition;
    means responsive to the generation of said machine stop signal, when the machine is in the "run" condition, for generating a second group of the control signals, when the series of forming steps is at the point in the machine cycle at which a stop routine is initiated, for controlling the forming means in a first stop routine to place the machine in a "safe" condition; and
    means responsive to the generation of said machine stop signal, when the machine is being controlled in said start routine, for exiting said start routine at a predetermined exit point in the machine cycle, different from the one point in the machine cycle at which a stop routine is initiated, and for entering a second stop routine for generating a third group of the control signals to place the machine in the "safe" condition.

2. A control means according to claim 1 wherein said third control signal generating means is responsive to the generation of said machine stop signal after said predetermined exit point for completing said start routine and entering said first stop routine.

3. A control means according to claim 1 wherein said third control signal generating means is responsive to the generation of said machine stop signal during said start routine for exiting said start routine and entering said first stop routine at a predetermined entry point in said first stop routine such that said second stop routine is the remainder of said first stop routine after said predetermined entry point.

4. A method for controlling a machine for forming articles of glassware from gobs of molten glass, the machine including forming means responsive to a plurality of control signals for controlling the machine in a "run" condition for forming an article of glassware from each one of the gobs in a cyclic predetermined series of forming steps wherein each machine cycle has at least one point at which a stop routine is initiated in response to a machine stop signal, the method comprising the steps of:
    generating a machine start signal;
    generating a first group of control signals in response to said machine start signal for controlling the forming means in a start routine to place the machine in a condition for performing the cyclic predetermined series of forming steps of the "run" condition;
    generating a machine stop signal;
    generating a second group of the control signals for controlling the forming means in a first stop routine to place the machine in a "safe" condition in response to the generation of said machine stop signal when the machine is in the "run" condition and the series of forming steps is at the one point in the machine cycle at which a stop routine is initiated; and
    generating a third group of the control signals at a predetermined exit point in said start routine, different from the one point in the machine cycle at which a stop routine is initiated, for controlling the forming means in a second stop routine to place the machine in a "safe" condition in response to the generation of said machine stop signal during said start routine.

5. A method according to claim 4 wherein said exit point corresponds to an entry point in said first stop routine and said third group of control signals is the remainder of said second group of control signals after said entry point.

6. In a machine for forming articles of glassware from gobs of molten glass, the machine including forming means responsive to a plurality of control signals for controlling the machine in a "run" condition for forming an article of glassware from each one of the gobs of molten glass in a cyclic predetermined series of forming steps wherein each machine cycle has a point at which a stop routine is initiated in response to a machine stop signal, a control means comprising:
    means for generating a machine start signal;
    means responsive to the generation of said machine start signal for generating a first group of control signals for controlling the forming means in a start routine to place the machine in a condition for performing the cyclic predetermined series of forming steps of the "run" condition;

means for generating a machine stop signal;

means responsive to the generation of said machine stop signal, when the machine is in the "run" condition, for generating a second group of the control signals, when the series of forming steps is at the point in the machine cycle at which a stop routine is initiated, for controlling the forming means in a first stop routine to place the machine in a "safe" condition; and means responsive to the generation of said machine stop signal, when the machine is being controlled in said start routine, for exiting said start routine at a predetermined exit point in the machine cycle, different from the point in the machine cycle at which a stop routine is initiated, and for entering a second stop routine for generating a third group of the control signals to place the machine in the "safe" condition.

7. A control means according to claim 6 wherein said third control signal generating means is responsive to the generation of said machine stop signal after said predetermined exit point for completing said start routine and entering said first stop routine.

8. A control means according to claim 6 wherein said third control signal generating means is responsive to the generation of said machine stop signal during said start routine for exiting said start routine and entering said first stop routine at a predetermined entry point in said first stop routine such that said second stop routine is the remainder of said first stop routine after said predetermined entry point.

9. A control means according to claim 6 wherein said third control signal generating means is responsive to the generation of said machine stop signal after said predetermined exit point for exiting said start routine at a second predetermined exit point in the machine cycle and for entering said second stop routine to generate said third group of the control signals.

10. In a machine for forming articles of glassware from gobs of molten glass, the machine including forming means responsive to a plurality of control signals for controlling the machine in a "run" condition for forming an article of glassware from each one of the gobs of molten glass in a cyclic predetermined series of forming steps wherein each machine cycle has at least one point at which a first stop routine is initiated in response to a machine stop signal, a control means comprising:

means for generating a machine start signal and a machine stop signal;

a start condition latch means responsive to the generation of said machine start signal for generating a plurality of start status signals;

means responsive to the generation of said start status signals for generating a first group of control signals for controlling the forming means in a start routine to place the machine in a condition for performing the cyclic predetermined series of forming steps of the "run" condition;

a run status condition latch means responsive to the generation of at least one of said start status signals for generating a run status signal when the machine is in a condition for performing the cyclic predetermined series of forming steps of the "run" condition;

a stop status condition latch means responsive to the generation of said machine stop signal and the generation of said run status signal for generating a first set of stop status signals and responsive to the generation of said machine stop signal and the generation of at least one of said start status signals for generating a second set of stop status signals;

means responsive to the generation of said first set of stop status signals for generating a second group of control signals, when the series of forming steps is at the one point in the machine cycle at which the first stop routine is initiated, for controlling the forming means in the first stop routine to place the machine in a "safe" condition; and means responsive to the generation of said second set of stop status signals for generating a third group of control signals, when the series of forming steps is at a predetermined exit point in the machine cycle which is different from the one point at which the first stop routine is initiated, for controlling the forming means in the second stop routine to place the machine in the "safe" condition.

11. A control means according to claim 10 wherein said start status condition latch means generates said one of said start status signals when the start routine is before the predetermined exit point in the start routine.

12. A control means according to claim 10 wherein said stop status condition latch means is responsive to the generation of said machine stop signal and the absence of said one of said start status signals for generating said first set of stop status signals.

13. A control means according to claim 10 further including means responsive to the generation of said start, run, and stop status signals for generating a safe status signal when the machine is in the "safe" condition.

14. A control means according to claim 13 wherein said start status condition latch means is responsive to the generation of said machine start signal, the generation of said safe signal, and the absence of said machine stop signal for generating said start status signals.

* * * * *